United States Patent
Avritzer et al.

(10) Patent No.: US 8,055,952 B2
(45) Date of Patent: *Nov. 8, 2011

(54) DYNAMIC TUNING OF A SOFTWARE REJUVENATION METHOD USING A CUSTOMER AFFECTING PERFORMANCE METRIC

(75) Inventors: Alberto Avritzer, Mountainside, NJ (US); Andre B. Bondi, Red Bank, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 930 days.

This patent is subject to a terminal disclaimer.

(21) Appl. No.: 11/225,989

(22) Filed: Sep. 14, 2005

(65) Prior Publication Data

US 2006/0117223 A1    Jun. 1, 2006

Related U.S. Application Data

(60) Provisional application No. 60/628,285, filed on Nov. 16, 2004.

(51) Int. Cl.
   *G06F 11/00* (2006.01)
(52) U.S. Cl. .................................... 714/47.2; 714/38.12
(58) Field of Classification Search ................. 714/47, 714/38
   See application file for complete search history.

(56) References Cited

U.S. PATENT DOCUMENTS

| | | | |
|---|---|---|---|
| 5,715,386 A | 2/1998 | Fultin, III et al. | |
| 6,026,391 A * | 2/2000 | Osborn et al. | 707/2 |
| 6,216,237 B1 | 4/2001 | Klemm et al. | |
| 6,457,143 B1 * | 9/2002 | Yue | 714/43 |
| 6,594,784 B1 | 7/2003 | Harper et al. | |
| 6,629,266 B1 | 9/2003 | Harper et al. | |
| 6,725,272 B1 * | 4/2004 | Susai et al. | 709/229 |
| 6,810,495 B2 | 10/2004 | Castelli et al. | |
| 6,857,086 B2 * | 2/2005 | Shaw | 714/55 |
| 7,055,063 B2 * | 5/2006 | Leymann et al. | 714/16 |
| 7,100,079 B2 * | 8/2006 | Gross et al. | 714/23 |
| 7,328,127 B2 * | 2/2008 | Otsuka et al. | 702/182 |
| 2002/0087612 A1 | 7/2002 | Harper et al. | |
| 2002/0087913 A1 | 7/2002 | Harper et al. | |
| 2002/0144178 A1 | 10/2002 | Castelli et al. | |
| 2003/0023719 A1 | 1/2003 | Castelli et al. | |
| 2003/0036882 A1 | 2/2003 | Harper et al. | |
| 2003/0037288 A1 | 2/2003 | Harper et al. | |
| 2003/0079154 A1 | 4/2003 | Park et al. | |
| 2004/0078657 A1 | 4/2004 | Gross et al. | |
| 2006/0085685 A1 * | 4/2006 | Cheston et al. | 714/38 |
| 2006/0129367 A1 * | 6/2006 | Mishra et al. | 703/13 |

* cited by examiner

*Primary Examiner* — Marc Duncan

(57) ABSTRACT

A computer-implemented method for triggering a software rejuvenation system and/or method includes receiving a request for resources, determining an estimated response time to the request for resources, determining that the estimated response time is greater than a first threshold, determining that a number of estimated response times greater than the first threshold is greater than or equal to a dynamic second threshold, and triggering the software rejuvenation system and/or method.

14 Claims, 5 Drawing Sheets

DYNAMIC TUNING OF A SOFTWARE REJUVENATION METHOD USING A CUSTOMER AFFECTING PERFORMANCE METRIC

This application claims priority to U.S. Provisional Application Ser. No. 60/628,285, filed on Nov. 16, 2004, which is herein incorporated by reference in its entirety.

BACKGROUND OF THE INVENTION

1. Technical Field

The present invention relates to software rejuvenation, and more particularly to a system and method for tuning a software rejuvenation method using a customer affecting performance metric.

2. Discussion of Related Art

In a large industrial software system extensive monitoring and management is needed to deliver expected performance and reliability. Some specific types of software failures, called soft failures, have been shown to leave the system in a degraded mode, where the system is still operational, but the available system capacity has been reduced.

Soft failures can be caused by the evolution of the state of one or more software data structures during (possibly) prolonged execution. This evolution is called software aging. Software aging has been observed in widely used software.

Soft bugs may occur as a result of problems with synchronization mechanisms, e.g., semaphores; kernel structures, e.g., file table allocations; database management systems, e.g., database lock deadlocks; and other resource allocation mechanisms that are essential to the proper operation of large multi-layer distributed systems. Since some of these resources are designed with self-healing mechanisms, e.g., timeouts, some systems may recover from soft bugs after a period of time.

The current mode of operation employs server based monitoring tools to provide a server health check. This approach may create a gap between a user perception of performance and a monitoring tool view of performance.

Therefore, a need exists for a system and method for tuning a software rejuvenation method using a customer affecting performance metric.

SUMMARY OF THE INVENTION

According to an embodiment of the present disclosure a computer-implemented method for triggering a software rejuvenation system and/or method includes receiving a request for resources, determining an estimated response time to the request for resources, determining that the estimated response time is greater than a first threshold, determining that a number of estimated response times greater than the first threshold is greater than or equal to a dynamic second threshold, and triggering the software rejuvenation system and/or method.

Determining the estimated response time includes sampling a plurality of response times, and determining an average response time, wherein the average response time is used as the estimated response time.

The first threshold varies according to a number of estimated response times greater than the first threshold, and the dynamic second threshold is determined each time the first threshold is varied. The method includes increasing the first threshold with the number of response times greater than the first threshold.

The dynamic second threshold is a positive integer.

According to an embodiment of the present disclosure, a computer-implemented method for triggering a software rejuvenation system and/or method includes receiving a request for resources, determining a response time to the request for resources, increasing a number of response times greater than a first threshold upon determining that the response time is greater than the first threshold, decreasing the number of response times greater than the first threshold upon determining that the response time is less than the first threshold, determining that the number of response times greater than the first threshold is greater than or equal to a dynamic second threshold, and triggering the software rejuvenation system and/or method.

The method includes increasing the first threshold by a number of standard deviations upon determining the number of response times greater than the first threshold is greater than D, wherein the first threshold can be increased K standard deviations, and wherein K and D are the same or different positive integers, and the second threshold is K multiplied by D, and re-determining the dynamic second threshold upon increasing the first threshold.

The method includes decreasing the first threshold by a number of standard deviations upon determining the number of response times greater than the first threshold is less than D, wherein the first threshold can be decreased K standard deviations, and wherein K and D are the same or different positive integers, and the second threshold is K multiplied by D, and re-determining the dynamic second threshold upon decreasing the first threshold.

The request for resources is generated by a client.

The request for resources is generated by a load injector.

The method includes initializing with the number of response times greater than the first threshold at zero, the first threshold set at a lowest level, and the dynamic second threshold at a highest level.

According to an embodiment of the present disclosure, a computer-implemented method for distinguishing between a burst of requests and a decrease in performance of a software product includes receiving a plurality of requests for resources, comparing each of the plurality of requests to a first variable threshold, varying the first variable threshold to distinguish between a burst of requests and a decrease in performance of a software product for handling the plurality of requests, varying a second variable threshold upon varying the first variable threshold, and triggering a software rejuvenation system and/or method upon determining that a number of response times greater than the variable threshold at a predetermined highest level is greater than or equal to the second variable threshold.

The computer-implemented method further includes determining a source of each request causing the software rejuvenation to be triggered, and determining a common source of a predetermined number of the requests causing the software rejuvenation to be triggered, wherein the software rejuvenation system or method is triggered at a computer node nearest to the common source from among a plurality of computer nodes.

The computer-implemented method further includes initializing with the number of response times greater than the first variable threshold at zero, the first variable threshold set at a lowest level, and the second variable threshold at a highest level.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a system and method identifies performance degradation and corrects it using software rejuvenation. The performance degradation, of aging software is detected by tracking and responding to changing values of a customer-affecting metric. The system and method ameliorates performance degradation by triggering a software rejuvenation event.

The software rejuvenation event is a pre-emptive restart of a running application or system to prevent future failures. The restart may terminate all threads in execution and release all resources associated with the threads. The software rejuvenation event may include additional activities, such as a backup routine or garbage collection.

The method for identifying performance degradation automatically distinguishes between performance degradation caused by bursts of arrivals (e.g., activity) and performance degradation caused by software aging. The method defines and identifies performance degradation caused by software aging for triggering software rejuvenation by monitoring customer-affecting metrics.

By monitoring user-experienced delays, an example of a customer-affecting metric, the method links a user view of system performance with a tool monitoring view of the system performance. Because customer-affecting metrics are used to trigger a rejuvenation method, the customer view of performance is the same as the tool monitoring system view of performance. In addition, because multiple containers (hereinafter "buckets") are used to count variability in the measured customer affecting metric, degradation that is a function of a transient in the arrival process can be distinguished from degradation that is a function of software aging. Further, sampling and summation of averages of the customer affecting metric can be determined, statistics theorems such as the central limit theorem, can be applied to the sampling and summation to detect system degradation.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
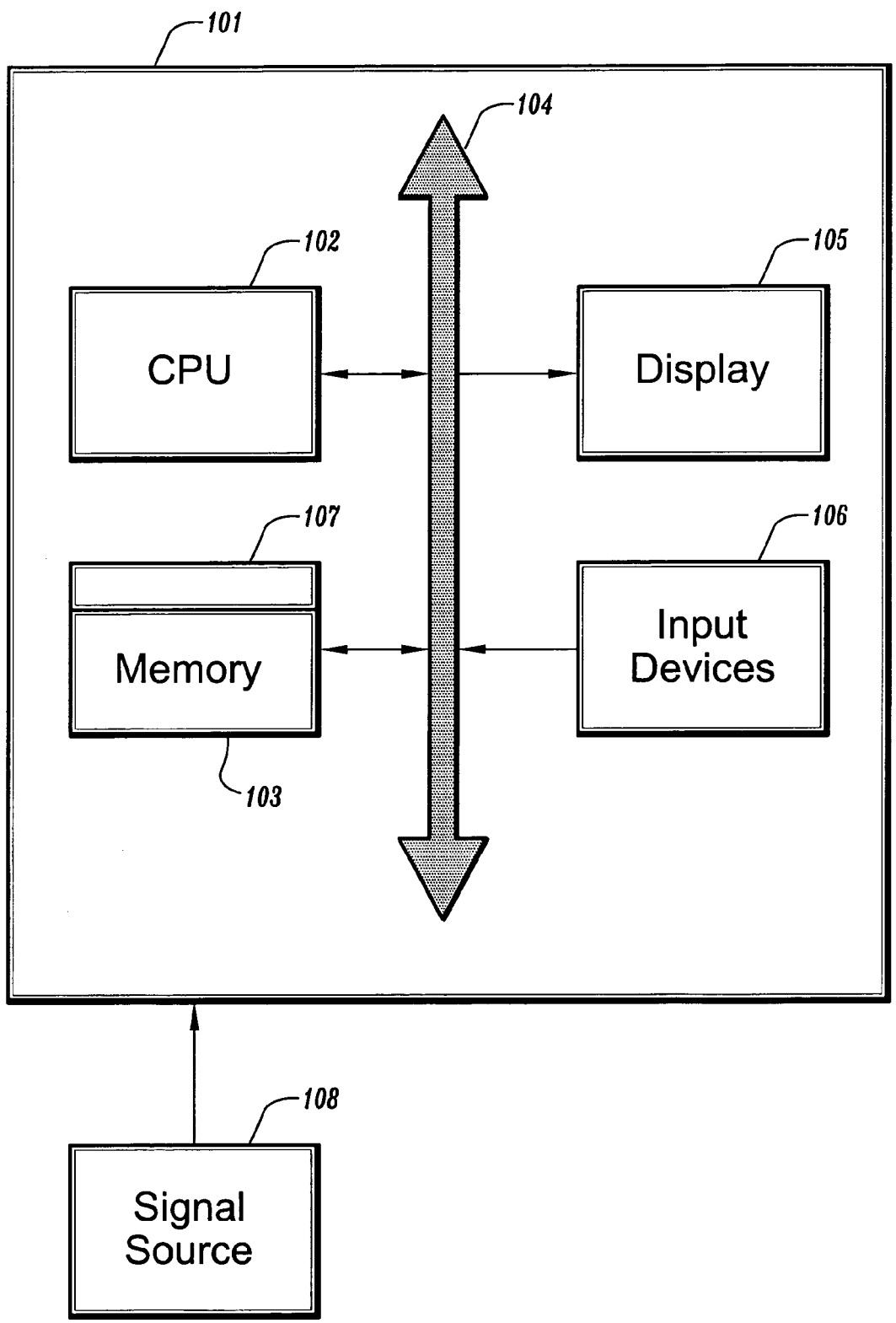
FIG. 1 is a diagram of a system according to an embodiment of the present disclosure.

Referring to FIG. 1, according to an embodiment of the present invention, a computer system 101 for implementing a method of software rejuvenation comprises, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present disclosure, a method distinguishes between performance degradation due to a burst of arrivals and performance degradation due to increased service time as a result of system capacity degradation. For example, if the system is operating at full capacity and a short burst of arrivals is presented, there should be no benefit in to executing the preventive maintenance routine. However, if system capacity has been degraded to such an extent that users are effectively locked out of the system, preventive maintenance may be warranted.

A customer affecting metric of performance, for example, a response time, can be sampled frequently, such as, every 2 seconds. The customer affecting metric can estimate a time when a computer system is operating at some threshold level, e.g., full capacity. Sampling can be performed using, for example, a monitoring tools or load injectors, deployed at important customer sites. Load injectors create virtual users who take the place of real users operating client software. A monitoring tool collects response times at various infrastructure components. Transaction requests from one or more virtual user clients are generated by the load injectors to create a load on one or more servers under test. Thus, an accurate estimate of the average transaction response time request can be determined.

During a window of measurement, samples are taken of transaction response time, when they terminate processing. K represents the total number of buckets available. D represents the depth of each bucket, e.g., the maximum number of occurrences the current bucket will store without overflow. If a last available bucket (e.g., bucket N=K) overflows, a rejuvenation routine is executed.

The levels of each of the K contiguous buckets is tracked. At any given time, the level d of only the $N^{th}$ bucket is considered. N is incremented when the current bucket overflows, i.e., when d first exceeds D, and is decremented when the current bucket is emptied, i.e., when d next takes the value zero.

Figure 2:
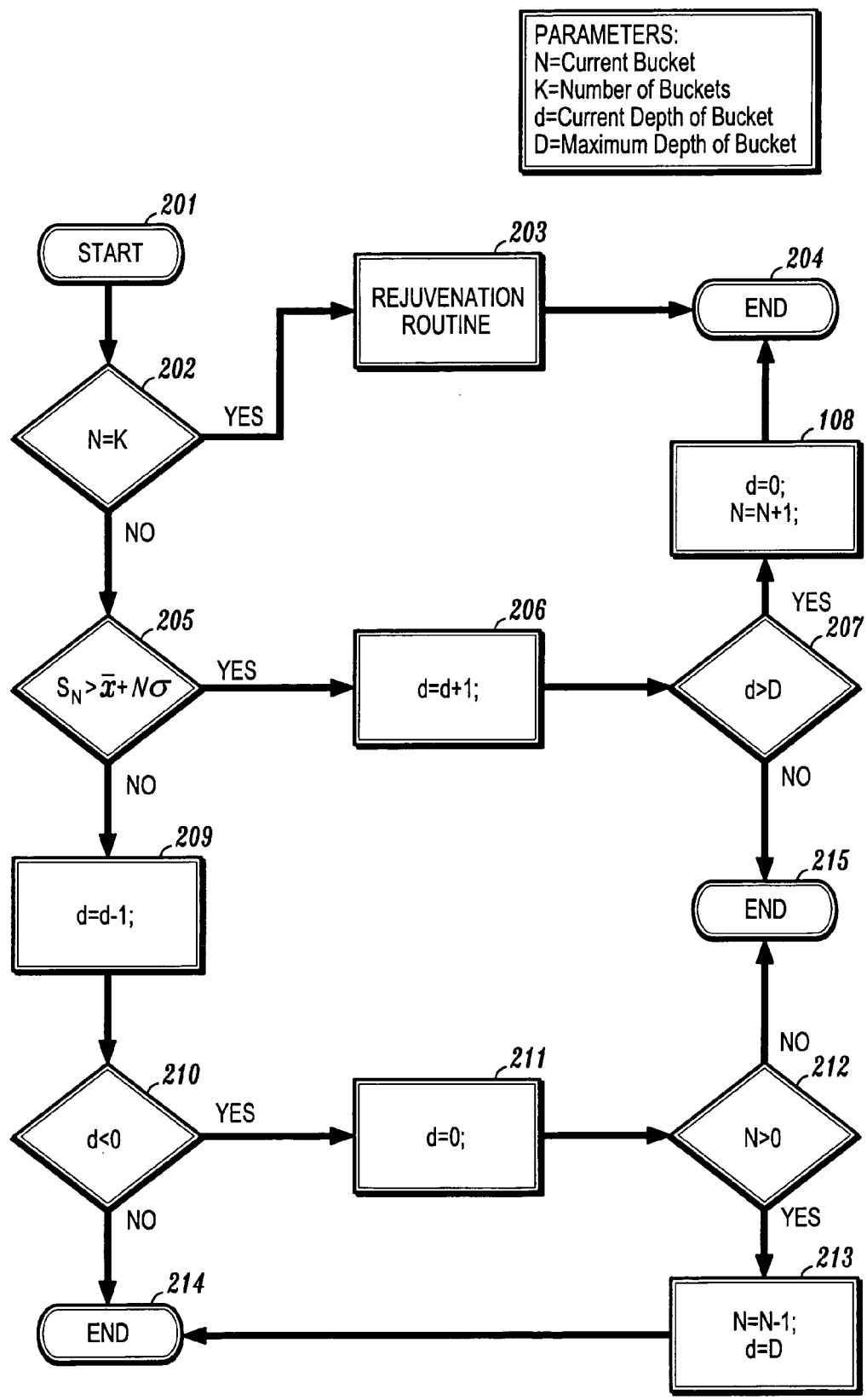
FIG. 2 is a flow chart of a method according to an embodiment of the present disclosure.

Referring to FIG. 2, for a sampled transaction 201 an estimate of current average delay may be determined as:

```
if (N == K ) 202
    then
        execute rejuvenation routine 203 and {END} 204
    elseif (S_N > x̄+Nσ) 205
        then
            do {d := d + 1;} 206
            if (d > D) 207
                then
                    do {d := 0; N := N + 1;} 208 and {END} 204
                else
                    do {END}215
        else
            do { d := d - 1; } 209
            if (d < 0) 210
                then
                    do {d := 0;} 211
                    if (N > 0) 212
                        then
                            do {d := D; N := N - 1;} 213 and
                            {END} 214
                        else
                            do {END} 215
                else
                    do {END} 215
```

Figure 3:
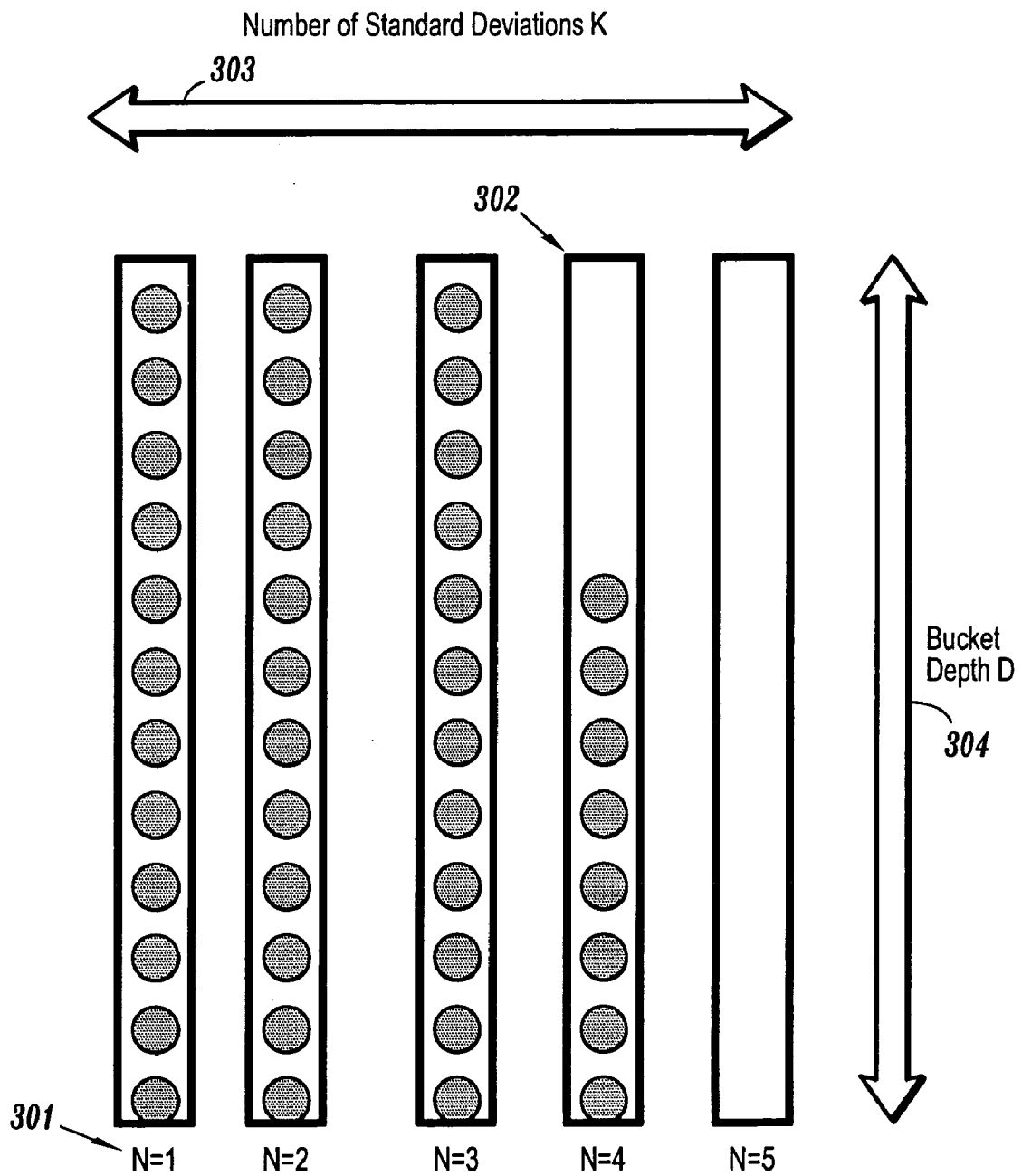
FIG. 3 is an illustration of a method according to an embodiment of the present disclosure.

A method according to an embodiment of the present disclosure is initialized at system startup, e.g., 201, and at rejuvenation 203 with d=0; N=0. Referring to FIG. 3, N represents a bucket index 301; in the example shown in FIG. 3 N=4. d represents the number of balls stored in the current bucket 302; in the example 8 balls are currently in bucket 4. The K contiguous buckets 303 are modeled, tracking the number of balls in each bucket. A ball is dropped into the current bucket 208 if a value of a customer-affecting metric such as a measured delay (e.g., a delay in responding to a transaction request) exceeds an expected value of the customer affecting metric 207, for example, 30 seconds. A ball is removed from the current bucket 213 if the measured delay is less than the expected value of the customer affecting metric 210 and 212.

When the current bucket overflows 205, an estimation of the expected delay is adjusted by adding one standard deviation to the expected value of the metric 206, moving to the next bucket. If a bucket underflows 205 the one standard deviation is subtracted from the estimation of the expected delay 209, moving to the previous full bucket.

The monitoring system architect or administrator can tune a method's resilience to a burst of arrivals (e.g., transaction requests) by changing the value of D 304. The method's resilience to degradation in the customer affecting metric is adjusted by tuning the value of K. K represents the number of standard deviations from the mean that would be tolerated before the software rejuvenation routine is activated.

A method according to an embodiment of the present disclosure delivers desirable baseline performance at low loads because it is activated when the customer affecting metric exceeds a predetermined target. This performance is achieved by using multiple contiguous buckets to track bursts in the transaction arrival process and a bucket depth to validate the moments in time where the estimate of the performance metric should be changed.

A method according to an embodiment of the present disclosure can be extended to allow for the application of several statistical functions for estimating the customer affecting metric, for example, taking the average of a window of sampling, or the max, or the min, or the median, or the sum; by using deviations whose magnitude varies with N, the index of the current bucket, by setting the current deviation to $\bar{x}+a_N\sigma$ for some set of coefficients $a_N$. The method may also allow for the possibility that the departure rate will decrease as the system degrades by making the bucket depths depend on the value of N. Then, D would be replaced by $D_N$.

According to an embodiment of the present disclosure, a method may be used to monitor the relevant customer affecting metrics in software products and to trigger software rejuvenation whence the estimate of the customer affecting metric exceeds a specified target.

It should be noted that throughout the specification, embodiments have been described using the terms "bucket" and "ball". These terms are analogous to any method for counting the occurrence of an event, for example, in computer science consider an element of an array as a bucket, wherein the array is K elements (e.g., buckets) long and each element stores a number representing a number of times an event has occurred (e.g., balls). One of ordinary skill in the art would appreciate that other methods of tracking a customer-affecting metric are possible.

According to an embodiment of the present disclosure, a method may be used to monitor the relevant customer affecting metrics in our products and to trigger software rejuvenation whence the estimate of the customer affecting metric exceeds a specified target.

By dynamically tuning the value of $D_N$ for each bucket N a dynamic method is easier to administer and provides a performance level that is automatically matched to the instantaneous departure process. The dynamic tuning of bucket depths allows for management of system performance both at high loads and at low loads. In addition, because the dynamic method uses multiple buckets, with dynamically tuned depths, to count the variability in the measured customer affecting metric, the method can distinguish between degradation that is a function of a transient in the arrival process and degradation that is a function of software aging.

Whenever a transaction terminates processing, estimate the value of the customer affecting metric, $S_N$, by counting the recent number of occurrences d of sample values that are greater than $\bar{x}+N_\sigma$, where $\bar{x}$ is the reference average expected value of the metric, N (=0, 1, 2, . . . , K) is the index to the current bucket, and σ is the reference expected standard deviation of the customer-affecting metric. K represents the total number of buckets used for the algorithm. $D_N$ represents the depth of bucket N. If the last available bucket overflows, the rejuvenation routine is executed. The algorithm works by tracking the levels of K contiguous buckets. At any given time, the level d of only the Nth bucket is considered. N is incremented when the current bucket overflows, i.e., when d first exceeds $D_N$, and is decremented when the current bucket is emptied, i.e., when d next takes the value zero. Whenever the Nth bucket overflows, the depth $D_{N+1}$ of the next bucket will be computed as $D_{N+1}=D_{MAX}/(S_{N-}(\bar{x}+N\sigma))$. $D_{MAX}$ is the maximum depth configured for the first bucket.

Figure 4:
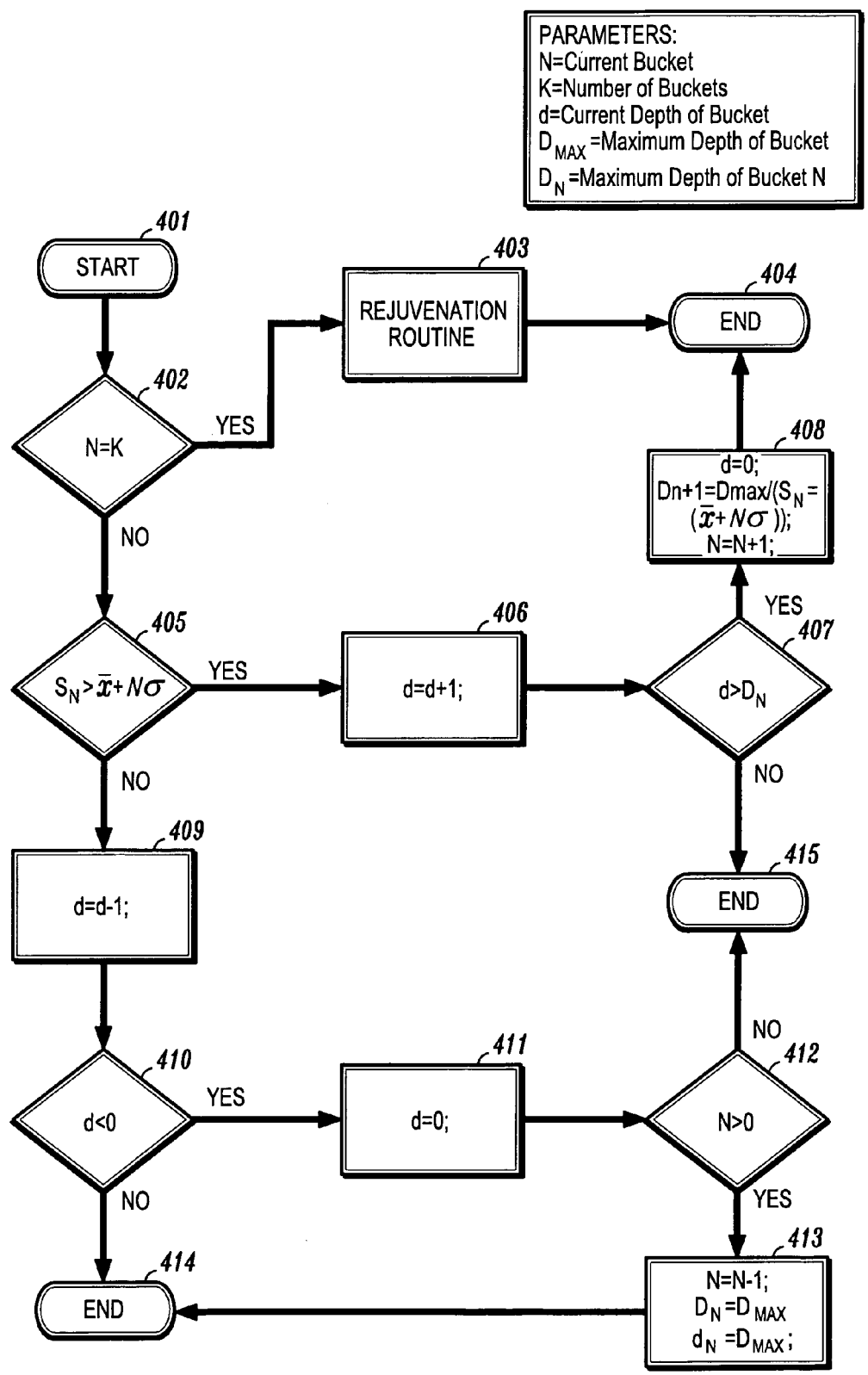
FIG. 4 is a flow chart of a method according to an embodiment of the present disclosure.

Referring to FIG. 4, a method for dynamic software rejuvenation can be written as:

```
if (N == K ) 402
    then
        execute rejuvenation routine 403 and {END} 404
    elseif (S_N > x̄+Nσ ) 405
        then
            do { d := d + 1;} 406
            if (d >D_N) 407
                then
                    do { d:= 0; D_{N+1} = D_{MAX} / (S_N - (x̄+Nσ));
                    N := N+1;} 408 and {END} 404
                else
                    do {END}415
```

-continued

```
        else
            do { d := d - 1; } 409
            if (d < 0) 410
                then
                    do {d := 0;} 411
                    if (N > 0) 412
                        then
                            do {d := D_MAX; N := N-1;
                                D_N = D_MAX;}
                            413 and {END} 414
                        else
                            do {END} 415
                else
                    do {END} 415
```

The dynamic method is initialized at system startup and at rejuvenation with d=0, N=0, $D_1=D_{MAX}$. The method works by modeling K contiguous buckets. A ball is dropped into the current bucket if the measured delay exceeds the expected value of the customer affecting metric. A ball is removed from the current bucket if the measured delay is smaller than the expected value of the customer affecting metric.

When the current bucket overflows, a depth of the next bucket is dynamically determined. In addition, an estimation of the expected delay is determined by adding one standard deviation to the expected value of the metric. This is equivalent to moving to the next bucket. If a bucket underflows the one standard deviation is subtracted from the estimation of the expected delay. This is equivalent to moving down to the previous bucket. N represents the current bucket index. d represents the number of balls stored in the current bucket. Thus, a method according to an embodiment of the present disclosure reacts quickly to significant performance degradation by dynamically determining the value of $D_N$. A method according to an embodiment of the present disclosure is resilience to degradation in the customer affecting metric is adjusted by tuning the value of K. K represents the number of standard deviations from the mean that would be tolerated before the software rejuvenation routine is activated.

A dynamic tuning method according to an embodiment of the present disclosure delivers desirable baseline-performance at low loads because it is only activated when the customer affecting metric exceeds the target. This performance is achieved by using multiple contiguous buckets to track bursts in the arrival process and a variable depth bucket to validate the moments where the estimate of the performance metric should be changed. A dynamic tuning method delivers superior performance at high loads because it quickly adjusts the current bucket depth when it detects a slowdown of the departure process.

The possibility that the departure rate will decrease non-linearly with $D_{MAX}$ is allowed for by using a generic function $F_N(D_{MAX})$ to estimated $D_{N+1}$ as the system degrades and making the bucket depth relationship to $D_{MAX}$ a function of $F_N$. Then, $D_{N+1}$ would be determined as $F_N(D_{MAX})$ as described above.

At very high loads, the rejuvenation feature can be targeted to rejuvenate only the components that are closer to a source of offending transactions. In a large distributed system this feature could be used to disrupt a denial of service attack, therefore protecting critical network resources. For example, a monitoring tool can track the source of each request causing the triggering of the software rejuvenation system or method, and target the software rejuvenation system or method to a source of a predetermined number of the requests, for example, 40% of the requests causing the triggering of the software rejuvenation system or method.

According to an embodiment of the present disclosure, a dynamic method for software rejuvenation can monitor the relevant customer affecting metrics in products and trigger software rejuvenation whence the estimate of the customer affecting metric exceeds a specified target. The dynamic tuning feature of the software rejuvenation method can be used to complement overload control algorithms to protect against denial of service attacks, because it reacts very quickly to slowdowns of the departure process.

Figure 5:
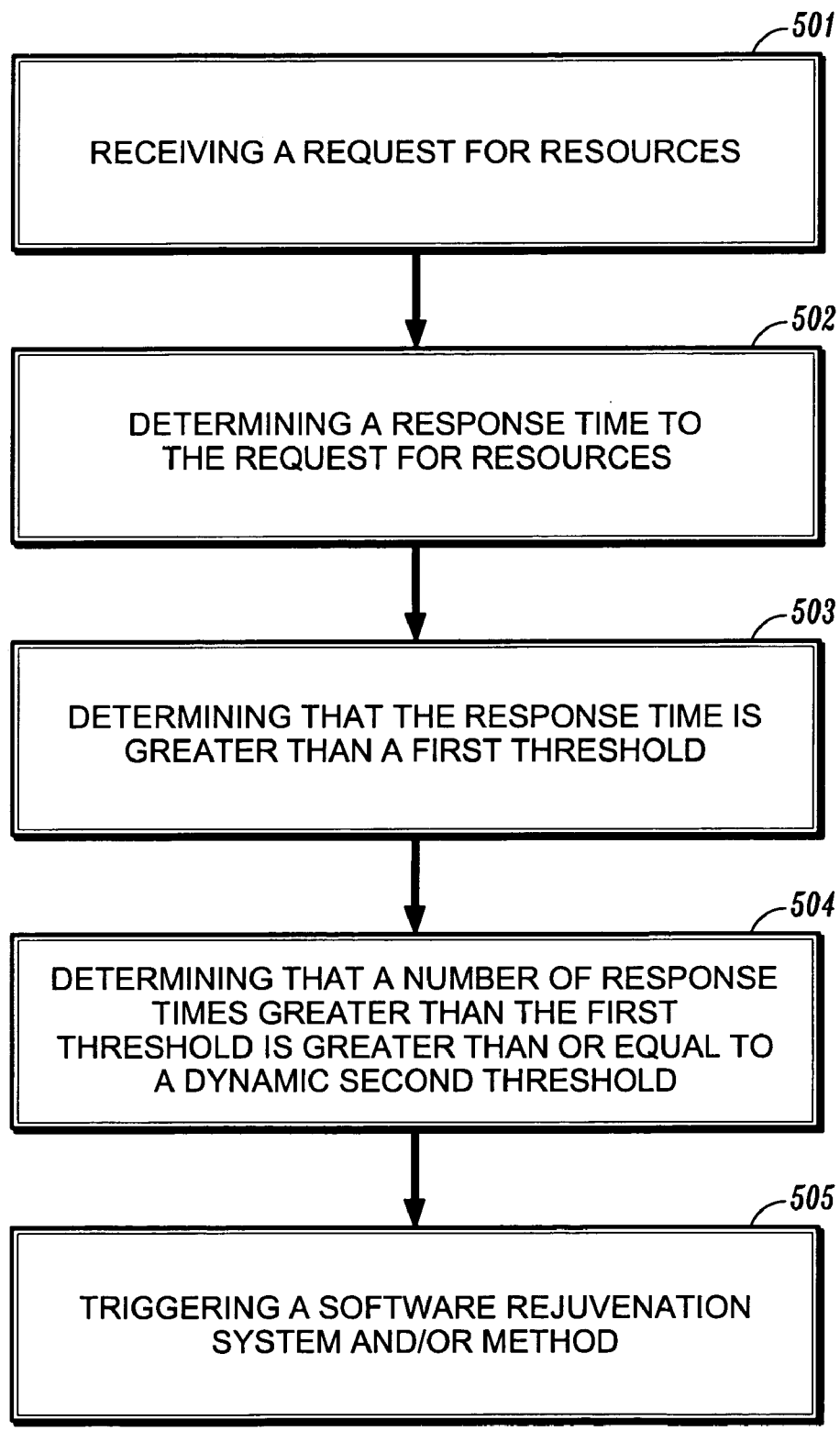
FIG. 5 is a flow chart of a method according to an embodiment of the present disclosure.

Referring to FIG. 5, according to an embodiment of the present disclosure, a tunable method for triggering a software rejuvenation system and/or method includes receiving a request for resources 501, determining a response time to the request for resources 502, determining that the response time is greater than a first threshold 503, determining that a number of response times greater than the first threshold is greater than a dynamic second threshold 504, and triggering the software rejuvenation system and/or method 505. The response time is an example of a customer-affecting metric, other metrics may be used, for example, a number of 504 errors received by a client (e.g., add a ball to a bucket upon receiving a 504 error and subtract a ball from the bucket upon receiving a valid response).

Having described embodiments for a system and method for dynamic software rejuvenation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for triggering a software rejuvenation system or method comprising:
    receiving a request for resources;
    determining an estimated response time to the request for resources;
    determining that the estimated response time is greater than a first threshold;
    determining that a number of estimated response times greater than the first threshold is greater than or equal to a dynamic second threshold; and
    triggering the software rejuvenation system or method.

2. The computer-implemented method of claim 1, wherein determining the estimated response time comprises:
    sampling a plurality of response times; and
    determining an average response time, wherein the average response time is used as the estimated response time.

3. The computer-implemented method of claim 1, wherein the first threshold varies according to a number of estimated response times greater than the first threshold, and the dynamic second threshold is determined each time the first threshold is varied.

4. The computer-implemented method of claim 3, further comprising increasing the first threshold with the number of response times greater than the first threshold.

5. The computer-implemented method of claim 1, wherein the dynamic second threshold is a positive integer.

6. A computer-implemented method for triggering a software rejuvenation system or method comprising:
    receiving a request for resources;
    determining a response time to the request for resources;
    increasing a number of response times greater than a first threshold upon determining that the response time is greater than the first threshold;

decreasing the number of response times greater than the first threshold upon determining that the response time is less than the first threshold;

determining that the number of response times greater than the first threshold is greater than or equal to a dynamic second threshold; and triggering the software rejuvenation system or method.

7. The computer-implemented method of claim 6, further comprising:

increasing the first threshold by a number of standard deviations upon determining the number of response times greater than the first threshold is greater than D, wherein the first threshold can be increased K standard deviations, and wherein K and D are the same or different positive integers, and the second threshold is K multiplied by D; and re-determining the dynamic second threshold upon increasing the first threshold.

8. The computer-implemented method of claim 6, further comprising:

decreasing the first threshold by a number of standard deviations upon determining the number of response times greater than the first threshold is less than D, wherein the first threshold can be decreased K standard deviations, and wherein K and D are the same or different positive integers, and the second threshold is K multiplied by D; and re-determining the dynamic second threshold upon decreasing the first threshold.

9. The computer-implemented method of claim 6, wherein the request for resources is generated by a client.

10. The computer-implemented method of claim 6, wherein the request for resources is generated by a load injector.

11. The computer-implemented method of claim 6, further comprising initializing with the number of response times greater than the first threshold at zero, the first threshold set at a lowest level, and the dynamic second threshold at a highest level.

12. A computer-implemented method for distinguishing between a burst of requests and a decrease in performance of a software product comprising:

receiving a plurality of requests for resources;

comparing each of the plurality of requests to a first variable threshold;

varying the first variable threshold to distinguish between a burst of requests and a decrease in performance of a software product for handling the plurality of requests;

varying a second variable threshold upon varying the first variable threshold; and triggering a software rejuvenation system or method upon determining that a number of response times greater than the variable threshold at a predetermined highest level is greater than or equal to the second variable threshold.

13. The computer implemented method of claim 12, further comprising:

determining a source of each request causing the software rejuvenation to be triggered; and determining a common source of a predetermined number of the requests causing the software rejuvenation to be triggered, wherein the software rejuvenation system or method is triggered at a computer node nearest to the common source from among a plurality of computer nodes.

14. The computer implemented method of claim 12, further comprising initializing with the number of response times greater than the first variable threshold at zero, the first variable threshold set at a lowest level, and the second variable threshold at a highest level.

* * * * *